A. WEYER.
Apparatus and Process for Annealing Glass.
No. 207,924. Patented Sept. 10, 1878.
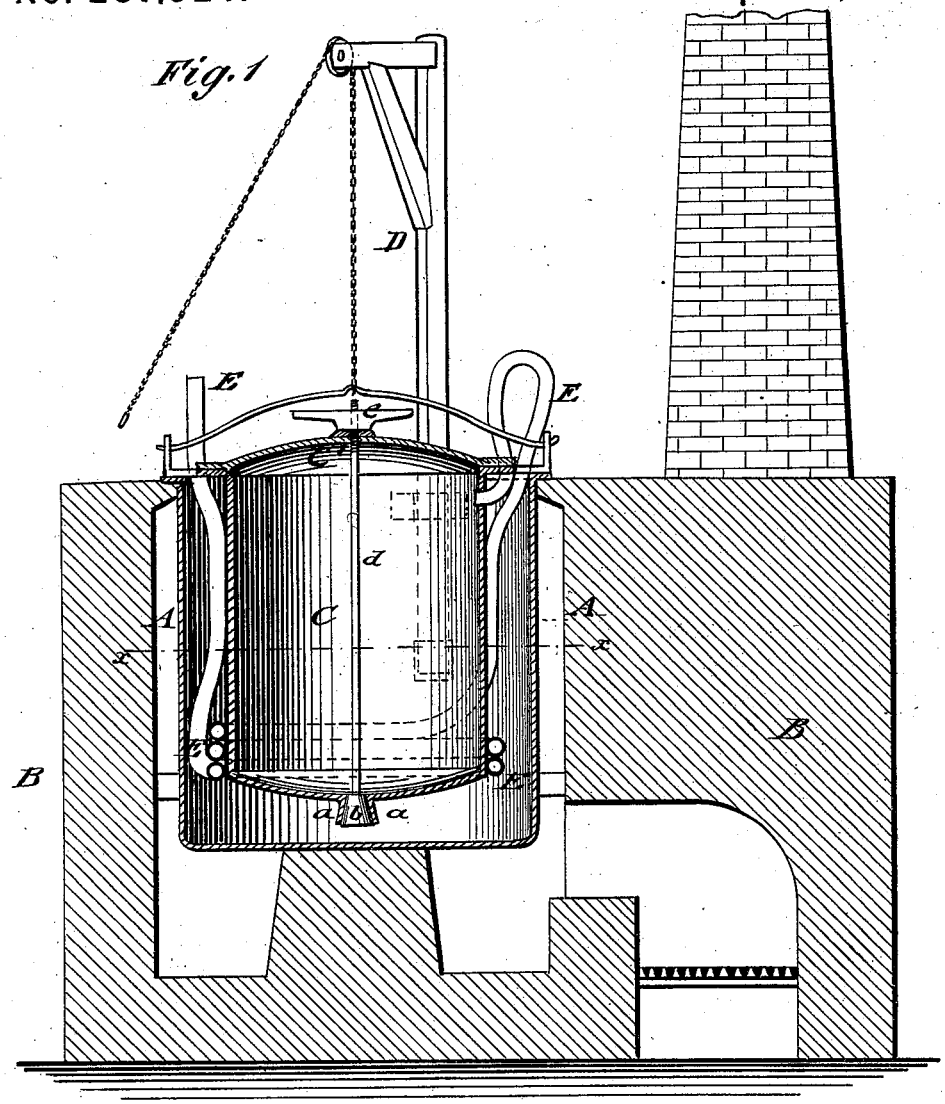
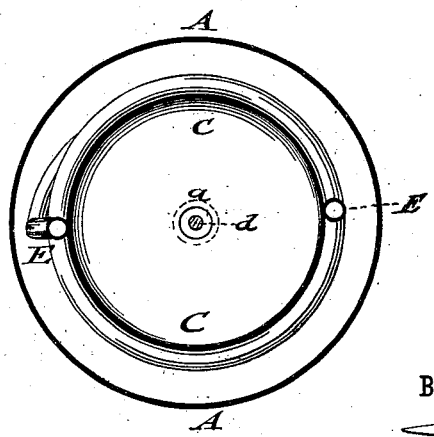

UNITED STATES PATENT OFFICE.

AUGUSTE WEYER, OF NEW YORK, N. Y.

IMPROVEMENT IN APPARATUS AND PROCESSES FOR ANNEALING GLASS.

Specification forming part of Letters Patent No. 207,924, dated September 10, 1878; application filed April 10, 1878.

*To all whom it may concern:*

Be it known that I, AUGUSTE WEYER, of New York city, in the county and State of New York, have invented a new and Improved Apparatus and Process for Annealing Glass, of which the following is a specification:

In the accompanying drawing, Figure 1 represents a vertical central section of my improved apparatus for annealing glass according to my process; and Fig. 2 is a horizontal section of the same on line $x$ $x$, Fig. 1.

Similar letters of reference indicate corresponding parts.

The object of this invention is to anneal glass in such a manner that a greater homogeneity is imparted to the same, which enables it to resist considerable changes of temperature without being liable to crack or break.

Glass annealed by my process may be suddenly cooled after having been heated to a high degree of heat, or vice versa, without danger of cracking, so as to be specially adapted for lamp-chimneys and other articles that are frequently exposed to transitions from high to low temperatures.

The invention consists of an exterior kettle, that is placed permanently into a suitable furnace, and of an interior detachable vessel with hermetically-closing and detachable lid, and with a conical bottom aperture that is closed by a conical plug, center screw-rod, and hand-wheel. The glass to be annealed is placed into the inner vessel, and the latter then lowered into the kettle, in which salts, such as nitrate of potash or other salts that melt at about 300° to 400° centigrade, and which obtain a temperature of 1,000° to 1,100° centigrade, are placed. When the proper temperature is reached the bottom opening is opened and the liquefied salts allowed to enter to the interior of the inner vessel, the air escaping by a pipe that extends from the upper part of the inner vessel down along the side of the same, and then in several coils around the lower part of the same, and up again to the open air. When the liquefied salts have reached their proper level the bottom aperture is closed and the glass articles exposed to the highest temperature.

For taking out the glass the inner vessel is slowly raised out of the liquid, the air being drawn in again by the coiled air-pipe, which, becoming heated by its passage through the lower heated coil, has the same temperature as the interior of the vessel. The vessel is then closed again, and the articles are then allowed to cool slowly.

Referring to the drawing, A represents a kettle of suitable size, that is supported permanently in the brick-work of the furnace B, into which the salts by which the annealing operation is accomplished are placed. A second interior vessel, C, of about half the size of the kettle, is suspended by a bail and chain from a swinging crane, D, and raised or lowered by suitable hoisting mechanism.

The vessel C is provided with a hermetically-sealing lid, C', that is firmly screwed down on the same, and with a bottom opening and conical guide-sleeve, $a$, which may be opened or closed by a corresponding plug, $b$, and screw-rod $d$, that extends centrally through the vessel C, and by a screw-nut, $e$, which is applied to the screw-rod above the lid. The interior vessel is also arranged with an air-conducting pipe, E, that extends from a point near the lid, first down along the side of the vessel, then in several coils around the lower part of the same, and finally in upward direction to a point above the same, where it opens into the atmospheric air. The air-pipe serves for the purpose of allowing the air in the vessel C to escape when the same is charged with the annealing-liquid, and also to admit the escape of the liquid, and the supply of a sufficient quantity of heated air after the annealing operation. The salts used for the annealing process are such which melt at a temperature from 300° to 400° centigrade, and which reach a maximum temperature of from 1,000° to 1,100°. This temperature is necessary for the purpose of so changing the glass molecules that they rearrange themselves, and become more homogeneous and compact, and capable of resisting sudden changes of temperature. Salts which serve this purpose are, for instance, nitrate of soda and nitrate of potash. The salts are placed into the kettle and there exposed to the heat of the furnace until they arrive at the melting-point. The articles of glass which have been arranged at the interior of the vessel C are then lowered with the same into the liquids formed by the salts, and exposed there to the heat of the same for about an hour. During this time the vessel C has been tightly closed both at the top and bottom. The bottom opening is then opened by lowering the plug, so that the annealing-liquid enters into the vessel C, and passes then around all the glass articles, and imparts to the same the same temperature as the liquid. The glass is then exposed for about two hours to this bath, and kept continually above a temperature of 800° centigrade, after which the liquid is allowed to cool until it approaches the point where it begins to solidify. The interior vessel is then slowly raised from the kettle, so that the liquid escapes through the bottom opening and produces a vacuum in the vessel, which causes the rushing in of atmospheric air through the serpentine pipe E. The air is then compelled to pass through the coils, which are still in the hot liquid, and is heated therein up to such a degree that it is of about the same temperature on entering the vessel as the articles therein. The air being supplied at this high temperature exerts no injurious influence upon the glass in the vessel, which it would do if it were to enter the same directly at the temperature of the outer air, in which case it would produce the sudden cooling of the glass and neutralize the effect produced by the annealing operation. When all the liquid has left the interior vessel, the bottom aperture is closed and the vessel removed to some suitable place, where it is allowed to cool slowly.

The annealing operation may be continued by charging a second vessel, lowering it into the kettle, and exposing it to the action of the annealing-liquid, then raising it out of the same and cooling the articles, as described.

Having thus described my invention, what I claim as new, and desire to secure by Letters Patent, is—

1. An apparatus for annealing glass, consisting of an exterior heating-kettle and of an interior removable vessel with hermetically-sealing lid, bottom aperture, and closing devices, and with an exterior serpentine air-pipe, that communicates with the interior of the vessel and with the atmospheric air, substantially as and for the purpose described.

2. The combination, with an annealing-vessel having a hermetically-sealing lid and a hollow bottom aperture and closing device for the entrance and exit of the annealing-liquid, of an air-conducting pipe that communicates with the interior of the vessel at the upper part and with the atmospheric air, and which is coiled around the lower part of the vessel, substantially as set forth.

3. The process herein described of annealing glass, consisting, first, in exposing the glass in a closed vessel to a certain temperature, then exposing it to the action of an annealing-liquid of considerably higher temperature, and finally cooling it slowly under admission of heated air of equal temperature, substantially as and for the purpose set forth.

AUGUSTE WEYER.

Witnesses:
C. SEDGWICK.
PAUL GOEPEL.